United States Patent [19]
Kirimoto et al.

[11] Patent Number: 4,656,479
[45] Date of Patent: Apr. 7, 1987

[54] RADAR SYSTEM

[75] Inventors: Tetsuo Kirimoto; Michimasa Kondo; Takahiko Fujisaka, all of Kanagawa, Japan

[73] Assignee: Mitsubishi Denki Kabushiki Kaisha, Tokyo, Japan

[21] Appl. No.: 690,938

[22] Filed: Jan. 14, 1985

[30] Foreign Application Priority Data

Feb. 8, 1984 [JP] Japan .................................. 59-21145

[51] Int. Cl.$^4$ ............................................. G01S 13/42
[52] U.S. Cl. ..................................... 342/94; 342/147; 342/149
[58] Field of Search ........... 343/16 R, 5 FT, 422–424, 343/444, 6.5 R, 16 M; 342/94

[56] References Cited
U.S. PATENT DOCUMENTS

| | | | |
|---|---|---|---|
| 4,206,462 | 6/1980 | Rabow et al. | 343/6.5 R X |
| 4,305,074 | 12/1981 | Barzana et al. | 343/16 R X |
| 4,532,515 | 7/1985 | Cantrell et al. | 343/16 R |

Primary Examiner—T. H. Tubbesing
Assistant Examiner—Mark Hellner
Attorney, Agent, or Firm—Bernard, Rothwell & Brown

[57] ABSTRACT

A radar system for finding the location of a second flying object from a first flying object, comprises a nondirectional antenna for radiating a first radio wave from the first flying object, a second nondirectional antenna provided on the second flying object to receive the first radio wave and to radiate a second radio wave generated by modulating the received first radio wave and an array antenna provided on the first flying object to receive the second radio wave. The respective amplitudes of the signals given by the antenna elements of the array antenna are compared individually with a specified level and an operation for determining the direction of arrival of the second radio wave is executed using the signals given by all the antenna elements when either of the amplitudes of the signals given by the antenna elements is greater than the specified level.

7 Claims, 10 Drawing Figures

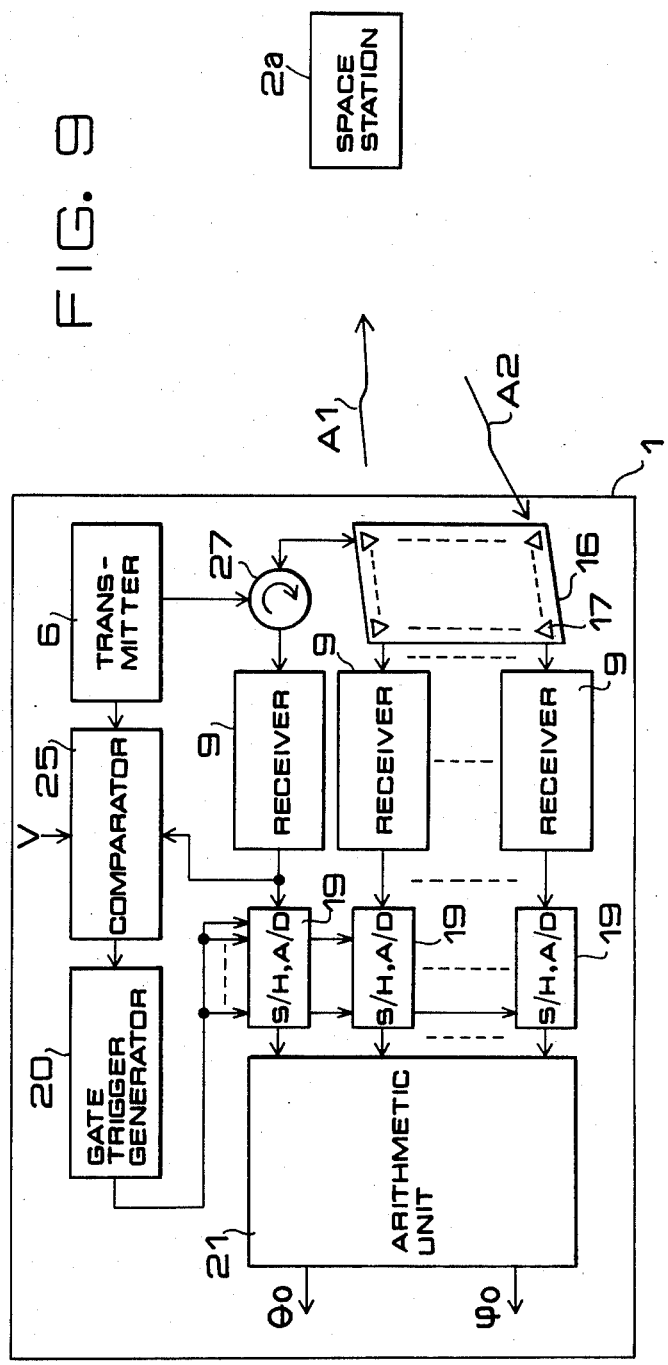

RADAR SYSTEM

BACKGROUND OF THE INVENTION

1. Field of the Invention

The present invention relates to improvements in a search and tracking radar system which is useful for the navigation of a spacecraft, for example, between a plurality of space stations.

2. Description of the Prior Art

First of all, a typical application of a radar system of this category will be described in terms of the conception of working on an assumption that the radar system is used as a navigation radar for the navigation of a spacecraft between a plurality of space stations. Referring to FIG. 1 showing the conception of working in the above-mentioned application of a radar system, there are shown a spacecraft 1, space stations 2a and 2b, the Earth 3, a first radio wave A1 transmitted from the spacecraft 1 and second radio waves A2 and A3 transmitted from the space stations 2a and 2b respectively. The second radio wave is generated in two cases, namely, in a case in which the first radio wave is reflected by the space station and in a case in which the space station generates internally the second radio wave.

Now, suppose that the spacecraft 1 approaches the space station 2a or 2b for docking. A navigation radar put aboard the spacecraft 1 makes a search for the space station which is a desired target. After the target has been detected, the navigation radar functions as a sensor for guiding the spacecraft 1. The objective space of the search is the entire space observable from the spacecraft 1. Accordingly, it is necessary to radiate radio waves simultaneously in all directions from the spacecraft 1 or to scan the entire space with a narrow beam.

Referring to FIG. 2 showing the constitution of a conventional radar system, there are shown a monopulse antenna 4, a sum antenna radiation pattern 5a, a difference antenna radiation pattern 5b in the direction of elevation, a difference antenna radiation pattern 5c in the azimuthal direction, a transmitter 6, a duplexer 7, a comparator 8, a receiver 9, a range tracker 10, an AGC (Automatic Gain Controller) 11, a goniometer 12, an antenna driving unit 13, a transponder antenna 14 and a transponder 15. The elements designated by reference characters 4 through 13 are put aboard the spacecraft 1 and the antenna 14 and the transponder 15 are placed on the space station 2a.

The first radio wave A1 generated by the transmitter 6 is radiated through the duplexer 7 and the monopulse antenna 4 toward the space station 2a. The monopulse antenna 4 consists of four horn antennas. These four horn antennas are used simultaneously to transmit the radio wave via the sum antenna radiation pattern 5a. The transponder antenna 14 receives the first radio wave A1 and supplies the same to the transponder 15. In response to the reception of the first radio wave A1, the transponder 15 generates after a delay of a fixed time the second radio wave A2, which is radiated into the external space through the transponder antenna 14. The four horn antennas constituting the monopulse antenna 4 receive the second radio wave and supply the same through the duplexer 7 to the comparator 8. The comparator 8 processes the four-channel input signals through addition or subtraction and gives known signals $\Sigma$, $\Delta_{EL}$ and $\Delta_{AZ}$ of three channels to the receiver 9. The $\Sigma$-signal corresponds to the signal given by receiving the second radio wave A2 by the antenna radiation pattern 5a, while the $\Delta_{EL}$-signal and the $\Delta_{AZ}$-signal correspond to the signals given by receiving the second radio wave A2 by the difference antenna radiation pattern 5b in the direction of elevation and the difference antenna radiation pattern 5c in the azimuthal direction respectively. The receiver 9 amplifies and detects the input signal of each channel and gives output signals to the goniometer 12. Part of the $\Sigma$-signal among the output signals of the receiver 9 is transferred to the range tracker 10. The range tracker 10 decides the time of reception of the second radio wave A2 and obtains the distance R from the spacecraft 1 to the space station 2a by the use of Equation (1).

$$R = \frac{C}{2}(t_E - t_S - t_D) \quad (1)$$

where $t_E$ is the time when the second radio wave A2 is received, $t_S$ is the time when the first radio wave A1 is transmitted, $t_D$ is the delay time before the radio wave generation by the transponder 15 and C is the velocity of light. The time $t_S$ is transferred from the transmitter 6 to the range tracker 10. $t_D$ is a known quantity.

The range tracker 10 generates gate pulses to actuate the receiver 9 only while the second radio wave A2 is received. The AGC 11 receives the gate pulses and controls the gain of the receiver 9 so that the gain of the receiver 9 is zero except while the voltage of the gate pulses is higher than a value. Consequently, the signals of the $\Sigma$-channel, $\Delta_{EL}$-channel and $\Delta_{AZ}$-channel are given to the goniometer 12 only while the second radio wave A2 is received. The goniometer 12 processes those input signals of the three channels and determines the direction of arrival of the second radio wave A2 according to the well-known monopulse goniometry employed in the monopulse radar. The angle information ($\theta_0$, $\phi_0$) is transferred together with distance information R given by the range tracker 10 to orbit computing means. The angle information and the distance information are used for deciding and correcting the docking orbit.

The angle information given by the goniometer 12 is transferred also to the antenna driving unit 13. The antenna driving unit 13 scans the monopulse antenna 4 on the basis of the angle information and drives the antenna so that the second radio wave A2 is received in alignment with the direction of the center line of the antenna to track the space station 2a.

In a situation as shown in FIG. 1, the spacecraft 1 does not always have the definite information of the direction of the space station 2a, i.e., the target of docking, and in some cases, it is possible that the spacecraft 1 is obliged to change the docking target from the space station 2a to the space station 2b during the approach to the space station 2a. Then, the radar system put aboard the spacecraft 1 needs first to make a search to catch the space station 2a or 2b in the field of view of the radar system. As well known, a monopulse radar uses a high gain antenna and the beam width of such an antenna usually is 10° or less. Accordingly, the above-mentioned search requires the scanning of antennas. Differing from the scanning operation of most terrestrial radar systems, the scanning of the entire space by the radar put aboard a spacecraft is not easy and requires much time. In addition, the operation of the mechanical antenna driving unit 13 for the search for targets affects adversely the payload of the spacecraft 1 or, even in the case of searching space stations through the attitude control of the spacecraft 1 itself, the fuel consumption of the spacecraft 1 is increased significantly. Furthermore, even after the space station has been caught and the tracking operation has been started, the space station needs to be always caught on the line of sight of the monopulse antenna for highly accurate tracking, and the highly accurate direction control of the antenna is necessary to make the spacecraft 1 approach the space station by means of an advanced navigation such as the proportional navigation. The use of a phased array antenna, which electrically scans the beam, instead of a mechanically scanned antenna eliminates mechanical means, however, since the phased array antenna forms a narrow beam, the phased array antenna is not suitable, similarly to a mechanically scanned antenna, for scanning the entire space and hence the phased array antenna can not reduce the time required to search for the space station.

SUMMARY OF THE INVENTION

Most briefly, a radar system according to the present invention comprises radio wave transmitting means which is put aboard a first flying object, radio wave transmitting-receiving means which is put aboard a second flying object and radio wave receiving means which is put aboard the first flying object for measuring the direction of arrival of the radio wave radiated from the second flying object. The radio wave transmitting means has a nondirectional antenna which radiates the first radio wave into the external space. The radio wave transmitting-receiving means has a second nondirectional antenna for receiving the first radio wave and a transponder which radiates a second radio wave produced by modulating the first radio wave received through the second nondirectional antenna into the external space.

The radio wave receiving means put aboard the first flying object has an array antenna having a two-dimensional arrangement of a plurality of nondirectional antenna elements which receives the second radio wave simultaneously, means to generate a trigger pulse when one of the amplitudes of the output signals given by each antenna element exceeds a predetermined value, means to sample and quantize output signals given by all the antenna elements simultaneously in response to the trigger pulse and goniometric means to measure the direction of arrival of the second radio wave through a predetermined computation using the quantized values.

In the present invention, a nondirectional antenna is used for radio wave transmission and an array antenna is used for radio wave reception. Therefore, a narrow beam can be scanned simultaneously over almost all or all space according the present invention. The radar system of this type can be designed in a more compact and lightweight configuration as compared with the conventional radar system and is favorably applicable particularly to the tracking operation between a spacecraft and space stations.

BRIEF DESCRIPTION OF THE DRAWINGS

FIG. 3b is a block diagram of the arithmetic unit of the radar system of FIG. 3a;

FIGS. 8 and 9 are block diagrams of radar systems according to fourth and fifth embodiments of the present invention respectively.

DETAILED DESCRIPTION OF THE PREFERRED EMBODIMENTS

Figure 3A:
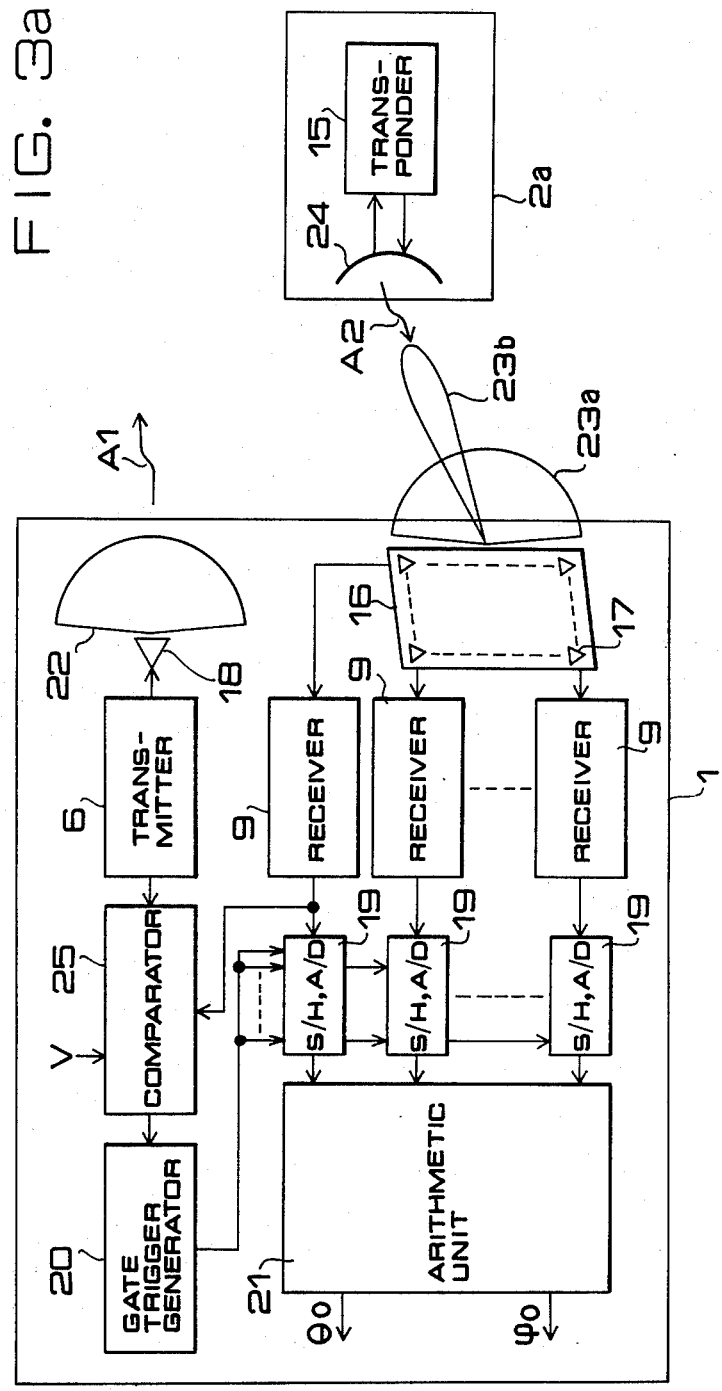
FIG. 3a is a block of a radar system according to a first embodiment of the present invention.

Referring to FIG. 3a showing the constitution of a preferred embodiment of the present invention, there are shown a receiving array antenna 16, antenna elements 17, a first nondirectional antenna 18 functioning as a transmitting antenna, sample holding and A/D converters 19 (each will be designated as "an S/H−A/D converter" hereinafter), a gate trigger generator 20, an arithmetic unit 21, the antenna radiation pattern 22 of the transmitting antenna 18, the antenna radiation pattern 23a of the antenna elements 17, the antenna radiation pattern 23b of the receiving array antenna, a second nondirectional antenna 24 functioning as an antenna for a transponder and a comparator 25.

A first radio wave A1 generated by a transmitter 6 is radiated into the external space through the transmitting antenna 18. The antenna radiation pattern 22 of the transmitting antenna 18 is nondirectional, therefore the first radio wave A1 is received by the transponder antenna 24 regardless of the relative position between a spacecraft 1 and a space station 2a, and hence the scanning operation is unnecessary. The first radio wave A1 received by the transponder antenna 24 is given to the transponder 15, which, in response to the reception of the first radio wave A1, generates a new second radio wave A2 after a fixed delay time and radiates the same through the transponder antenna 24 into the external space. As both the transponder antenna 24 and the antenna elements 17 are nondirectional, the second radio wave A2 is received by all the antenna elements 17 constituting the receiving array antenna 16 regardless of the relative position between the spacecraft 1 and the space station 2a, and hence the scanning operation of the receiving array antenna is unnecessary. The second radio wave A2 received by each antenna element 17 is transferred to the corresponding receiver 9, which converts the received second radio wave A2 through amplification and synchronous detection into a complex signal and transfers the complex signal to the S/H−A/D converter 19.

The S/H−A/D converter 19 samples and quantizes the complex signal given thereto to convert the complex signal into a complex value and transfers the complex value to the arithmetic unit 21. The timing of the S/H−A/D converter 19 sampling and quantizing the complex signal is controlled by the trigger pulse given by the gate trigger generator 20. The gate trigger generator 20 generates the trigger pulse only when the complex signal given by the receiver 9 is supplied to the S/H−A/D converter 19. The comparator 25 decides the timing of trigger pulse generation in the gate trigger generator 20. The comparator monitors always the magnitude of the amplitude of the output signal of a particular one of the receivers 9, compares the magnitude of the amplitude of the output signal with a predetermined threshold value V and decides if the magnitude is greater than or smaller than the threshold. The comparator 25 decides that the second radio wave A2 has been received only when the magnitude exceeds the threshold value V and sets an output voltage higher than a preset voltage a (volt), and then resets the output voltage again after a fixed period of time at a voltage below the voltage a (volt). The gate trigger generator 20 monitors the output of the comparator 25 continuously and gives the trigger pulse at a moment when the output of the comparator 25 changes from a value below the voltage a (volt) to a value above the voltage a (volt).

Thus, according to the present invention, the S/H−A/D converters sample and quantize the input signals only at a particular time, which diminishes the amount of data to be transferred to the arithmetic unit 21 remarkably and miniaturizes the size of the arithmetic unit 21.

Figure 3B:
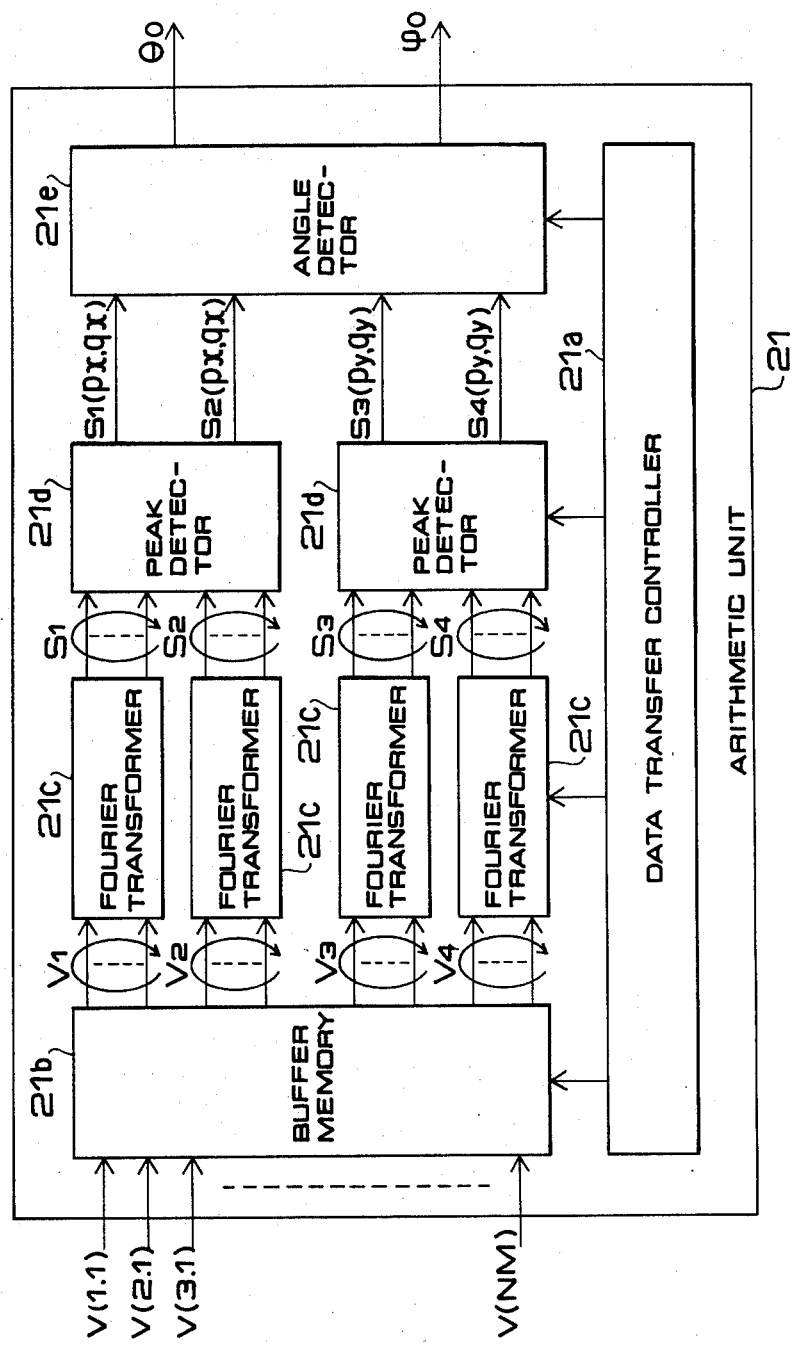

Referring to FIG. 3b showing the constitution of the arithmetic unit 21 in the form of a block diagram, there are shown a data transfer controller 21a a buffer memory 21b, Fourier transformers 21c, peak detectors 21d and an angle detector 21e. The internal operation of the arithmetic unit 21 will be described in detail. First the parameters necessary for the logical explanation of the arithmetic unit will be introduced.

Figure 1:
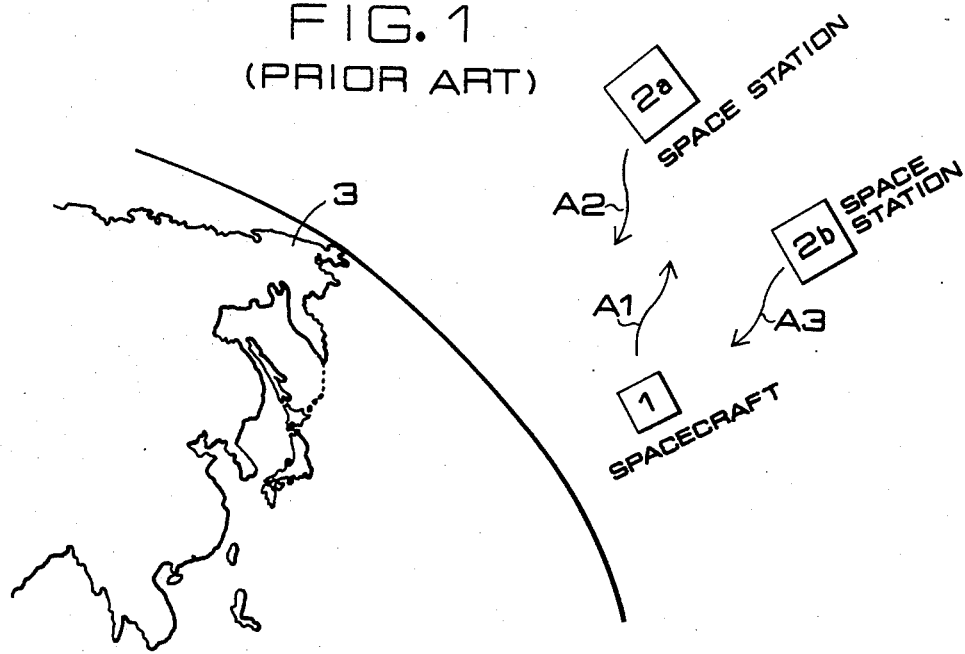
FIG. 1 is a view illustrating the conception of an exemplary working of a radar system.
Figure 4:
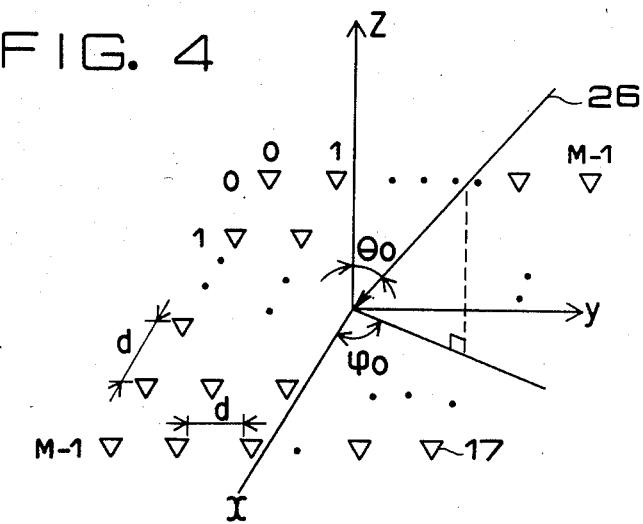
FIG. 4 is a view showing the three-dimensional arrangement of the antenna elements of an array antenna.
Figure 2:
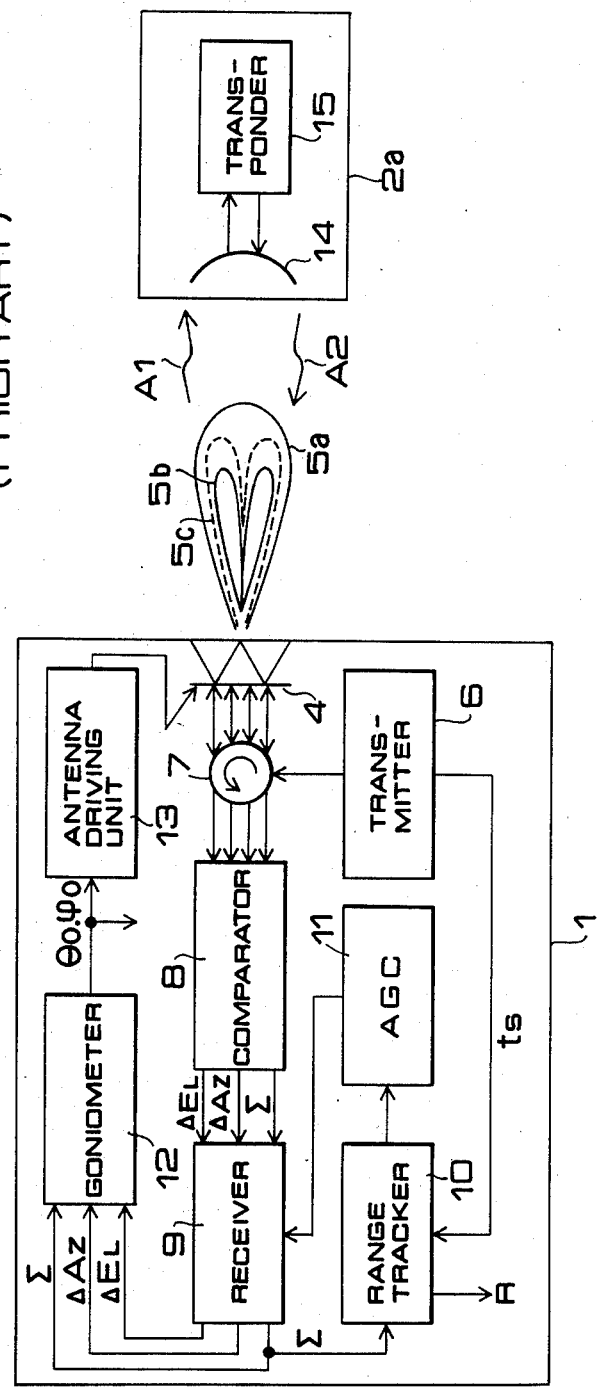
FIG. 2 is a block diagram showing a conventional radar system suitable for working as shown in FIG. 1.

FIG. 4 is an enlarged view of the array antenna 16. In FIG. 4, indicated at 26 is the direction of arrival of the second radio wave A2 transmitted from the space station 2a. Suppose that the antenna elements 17 are arranged two-dimensionally on a plane x-y, M pieces of antenna elements along the x-direction at an interval d and M pieces of antenna elements along the y-direction at the same interval d.

As shown in FIG. 4, the lines and the rows of the antenna elements are numbered sequentially from 0 through M−1 and, for convenience' sake, the antenna element 17 located, for instance, at the point of intersection of line m and row n is designated as an antenna element (m, n) to specify the antenna elements 17 and the corresponding S/H−A/D converter 19 is designated likewise as a S/H−A/D converter (m, n).

The direction of arrival 26 of the second radio wave is defined by an azimuth angle $\phi_0$ and an elevation angle $\theta_0$.

Now, $M^2$ sets of complex values V (m, n) given by the S/H−A/D converters (m, n) (m=0, 1, ..., M-1, n=0, 1, ..., M-1) are stored temporarily in the buffer memory 21b. The data transfer controller 21a controls data transfer between the buffer memory 21b, the Fourier transformers 21c, the peak detectors 21d and the angle detector 21e. First the data transfer controller 21a divides the complex values V (m, n) stored in the buffer memory 21b into four blocks as expressed by the following expressions and transfers the same from the buffer memory 21b to the Fourier transformers 21c.

$$1 \ V_1 = \{V(m, n), m = 0 \sim \frac{M}{2} - 1, n = 0 \sim M - 1\} \quad (2)$$

$$2 \ V_2 = \{V(m, n), m = \frac{M}{2} \sim M - 1, n = 0 \sim M - 1\}$$

$$3 \ V_3 = \{V(m, n), m = 0 \sim M - 1, n = 0 \sim \frac{M}{2} - 1\}$$

-continued $$4 \ V_4 = \{V(m, n), m = 0 \sim M - 1, n = \frac{M}{2} \sim M - 1\}$$

The Fourier transformers 21c process the groups V1 to V4 of complex values defined by Exp. (2) through discrete Fourier transformation to provide Fourier spectra Si (p, q) represented by Exps. (3), (4), (5) and (6).

$$S_1(p,q) = \sum_{m=0}^{\frac{M}{2}-1} \sum_{n=0}^{M-1} V(m,n) \exp\left[-j2\pi\left(\frac{pm}{\frac{M}{2}} + \frac{qn}{M}\right)\right] \quad (3)$$

$$p = 0 \sim \frac{M}{2} - 1, q = 0 \sim M - 1$$

$$S_2(p,q) = \quad (4)$$

$$\sum_{m=0}^{\frac{M}{2}-1} \sum_{n=0}^{M-1} V\left(m + \frac{M}{2}, n\right) \exp\left[-j2\pi\left(\frac{pm}{\frac{M}{2}} + \frac{qn}{M}\right)\right]$$

$$p = 0 \sim \frac{M}{2} - 1, q = 0 \sim M - 1$$

$$S_3(p,q) = \sum_{m=0}^{M-1} \sum_{n=0}^{\frac{M}{2}-1} V(m,n) \exp\left[-j2\pi\left(\frac{pm}{M} + \frac{qn}{\frac{M}{2}}\right)\right] \quad (5)$$

$$p = 0 \sim M, q = 0 \sim \frac{M}{2} - 1$$

$$S_4(p,q) = \quad (6)$$

$$\sum_{m=0}^{M-1} \sum_{n=0}^{\frac{M}{2}-1} V\left(m, n + \frac{M}{2}\right) \exp\left[-j2\pi\left(\frac{pm}{M} + \frac{qn}{\frac{M}{2}}\right)\right]$$

$$p = 0 \sim M, q = 0 \sim \frac{M}{2} - 1$$

Then, the data transfer controller 21a transfers the Fourier spectra $S_1(p, q)$ and $S_2(p, q)$ to the peak detector 21d and the Fourier spectra $S_3(p, q)$ and $S_4(p, q)$ to the other peak detector 21d.

The peak detector 21d detects values for $S_1(p_x, q_x)$ and $S_2(p_x, q_x)$ which maximize $|S_1(p, q)| + |S_2(p, q)|$ according to Exp. (7). The peak detector 21d detects values for $S_3(p_y, q_y)$ and $S_4(p_y, q_y)$ which maximize $|S_3(p, q)| + |S_4(p, q)|$ according to Exp. (8).

$$(p_x, q_x) \xleftarrow[p=p_x, q=q_x]{} \max_{p,q} \{|S_1(p,q)| + |S_2(p,q)|\} \quad (7)$$

$$(p_y, q_y) \xleftarrow[p=p_y, q=q_y]{} \max_{p,q} \{|S_3(p,q)| + |S_4(p,q)|\} \quad (8)$$

where $$\max_{p,q} \{$$

is the maximum value for the variation of p and q. The Fourier transformation using Exps. (3) through (6) is equivalent to the scanning operation of the antenna radiation pattern 23b of the array antenna and gives the same effect as the simultaneous scanning of the entire space. The operations using the Exps. (7) and (8) is equivalent to the detection of the direction of arrival of the second radio wave. Thus the operation using Exps. (3) to (8) is regarded as the simultaneous search of the entire space for the space station. Since the angle information given by $p_x$, $q_x$, $p_y$ and $q_y$ is not accurate enough to track the space station, the following operation is executed successively.

The data transfer controller 21a transfers the spectra $S_1(p_x, q_x)$, $S_2(p_x, q_x)$, $S_3(p_y, q_y)$ and $S_4(p_y, q_y)$ from the peak detectors 21d to the angle detector 21e. The angle detector 21e is capable of executing known monopulse operation and in this case the phase monopulse operation is executed. The amplitude monopulse operation is slightly different only in the contents of operation from the phase monopulse operation and either operation may be employed for the same effect of the present invention.

The angle detector 21e processes the input signals $S_1(p_x, q_x)$, $S_2(p_x, q_x)$, $S_3(p_y, q_y)$ and $S_4(p_y, q_y)$ through the operation represented by Exps. (9) to (12) to derive the data of the direction of arrival 26 (azimuth angle $\phi_0$), elevation angle $\theta_0$)

$$\phi_0 = \text{Arctan}(\phi_y/\phi_x) \tag{9}$$

$$\theta_0 = \text{Arctan}(\phi_x \lambda / \cos \phi_0 \pi d M) \tag{10}$$

where d is the interval between the antenna elements, $\lambda$ is the transmitting wavelength and Arg (·) is the argument of the complex number.

$$\phi_x = \text{Arg}(S_2(p_x, q_x)/S_1(p_x, q_x)) \tag{11}$$

$$\phi_y = \text{Arg}(S_4(p_y, q_y)/S_3(p_y, q_y)) \tag{12}$$

Thus the arithmetic unit 21 derives the direction of arrival of the second radio wave through the discrete Fourier transformation represented by Exps. (3) to (6), the maximum value detecting operation represented by Exps. (7) and (8) and the monopulse operation represented by Exps. (9) to (12).

The principle of deriving the direction of arrival of a radio wave through the above-mentioned operations will be described hereunder fully and distinctly. Suppose the direction of arrival 26 of the second radio wave is represented by an azimuth angle $\phi_0$ and an elevation angle $\theta_0$. Then, the complex values V (m, n) given by the S/H−A/D (m, n) are represented with the negligence of the quantization error by the following mathematical expressions:

$$V(m, n) = A \exp[j2\pi d(m f_{x0} + n f_{y0})] \tag{13}$$

$$m = 0, \sim M - 1, n = 0, \sim M - 1$$

$$f_{x0} = \frac{\sin\theta_0 \cos\phi_0}{\lambda} \tag{14}$$

$$f_{y0} = \frac{\sin\theta_0 \sin\phi_0}{\lambda} \tag{15}$$

where A is a value proportional to the amplitude of the second radio wave, d is the interval between the antenna elements and $\lambda$ is the transmitting wavelength.

Substituting Exp. (13) into Exps. (3) to (6) yields the mathematical expressions of the Fourier spectra derived by the Fourier transformation 21c in the forms of Exps. (16) to (19):

$$S_1(p,q) = A \exp\left[-j\pi d\left(\frac{M}{2} - 1\right)\left(\frac{p}{\frac{M}{2}d} - f_{x0}\right)\right] \tag{16}$$

$$\frac{\sin \pi d \frac{M}{2}\left(\frac{p}{\frac{M}{2}d} - f_{x0}\right)}{\sin \pi d \left(\frac{p}{\frac{M}{2}d} - f_{x0}\right)}$$

$$\exp\left[-j\pi d(M-1)\left(\frac{q}{Md} - f_{y0}\right)\right] \frac{\sin \pi dM\left(\frac{q}{Md} - f_{y0}\right)}{\sin \pi d\left(\frac{q}{Md} - f_{y0}\right)}$$

$$p = 0 \sim \frac{M}{2} - 1, q = 0 \sim M - 1$$

$$S_2(p,q) = \exp\left[j2\pi d \frac{M}{2} f_{x0}\right] \cdot S_1(p,q) \tag{17}$$

$$p = 0, \sim, \frac{M}{2} - 1, q = 0, \sim, M - 1$$

$$S_3(p,q) = A \exp\left[-j d(M-1)\left(\frac{p}{Md} - f_{x0}\right)\right] \tag{18}$$

$$\frac{\sin \pi dM\left(\frac{p}{Md} - f_{x0}\right)}{\sin \pi d \left(\frac{p}{Md} - f_{x0}\right)}$$

$$\exp\left[-j\pi d\left(\frac{M}{2} - 1\right)\left(\frac{q}{\frac{M}{2}d} - f_{y0}\right)\right] \frac{\sin \pi d \frac{M}{2}\left(\frac{q}{\frac{M}{2}d} - f_{y0}\right)}{\sin \pi d\left(\frac{q}{\frac{M}{2}d} - f_{y0}\right)}$$

$$p = 0, \sim, M - 1, q = 0, \sim, \frac{M}{2} - 1$$

$$S_4(p,q) = \exp\left[j2\pi d \frac{M}{2} f_{y0}\right] S_3(p,q) \tag{19}$$

$$p = 0, \sim, M - 1, q = 0, \sim, \frac{M}{2} - 1$$

Substituting Exps. (16) to (19) into Exps. (9) and (10) respectively and using Exps. (14) and (15) yield the mathematical expressions of $\phi_x$ and $\phi_y$:

$$\phi_x = 2\pi \cdot \frac{Md}{2} f_{x0} = 2\pi \cdot \frac{Md}{2} \frac{\sin\theta_0 \cos\phi_0}{\lambda} \tag{20}$$

$$\phi_y = 2\pi \cdot \frac{Md}{2} f_{y0} = 2\pi \cdot \frac{Md}{2} \frac{\sin\theta_0 \sin\phi_0}{\lambda} \quad (21)$$

Exps. (20) and (21) represent the relation between the values ($\phi_x$, $\phi_y$) derived by the angle detector 21e and the direction of arrival 26 (azimuth angle $\phi_0$, elevation angle $\theta_0$) of the second radio wave and indicate that the direction of arrival of the second radio wave can be derived uniquely from $\phi_x$ and $\phi_y$. Changing Exps. (20) and (21) yields readily Exps. (11) and (12).

As apparent from what has been described hereinbefore, according to the present invention, the antenna need not be scanned mechanically for searching and tracking, which readily enables the reduction in weight of the radar system. Furthermore, the arithmetic operation of the received signals gives a scanning effect equivalent to the simultaneous scanning of the entire space with narrow antenna beams, and thereby the target searching time can be reduced remarkably. Still further, since spaceborne communication systems use in most cases nondirectional antennas, the radar system of the present invention is capable of using most of the microwave components including the antenna of the communication system in common, which reduces the overall weight of the equipments to be put aboard the spacecraft.

Figure 5:
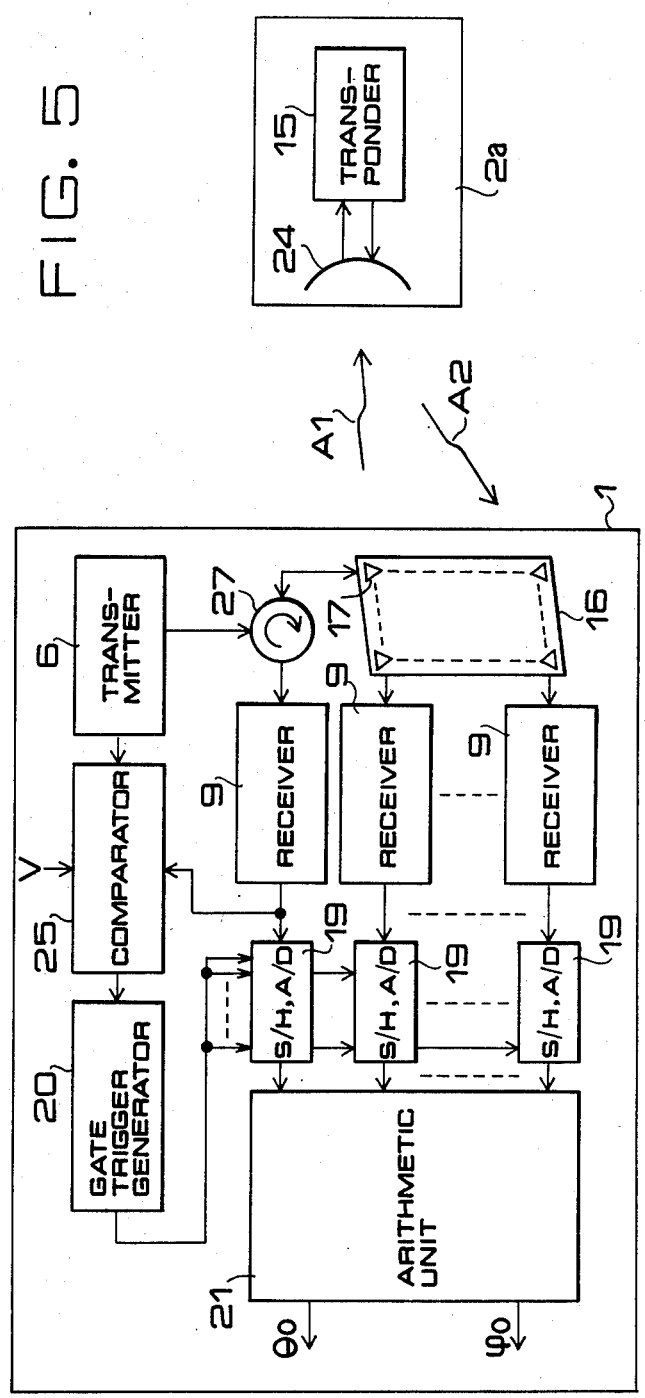
FIGS. 5 and 6 are block diagrams of radar systems according to second and third embodiments of the present invention respectively.

The invention has been described with reference to a preferred embodiment thereof in which the radar system is equipped with two separate antennas, i.e., a transmitting antenna and a receiving array antenna. However, the present invention is not limited thereto, but may be embodied in a radar system in which one of the antenna elements constituting the receiving array antenna may be used for transmitting radio waves. FIG. 5 shows a second embodiment of the present invention. The constitution and the functions of the second embodiment are entirely the same as those of the first embodiment, except that the second embodiment is provided with a duplexer 27 and a particular one of the antenna elements 17 of the array antenna 16 is used as a transmitting antenna.

Figure 6:
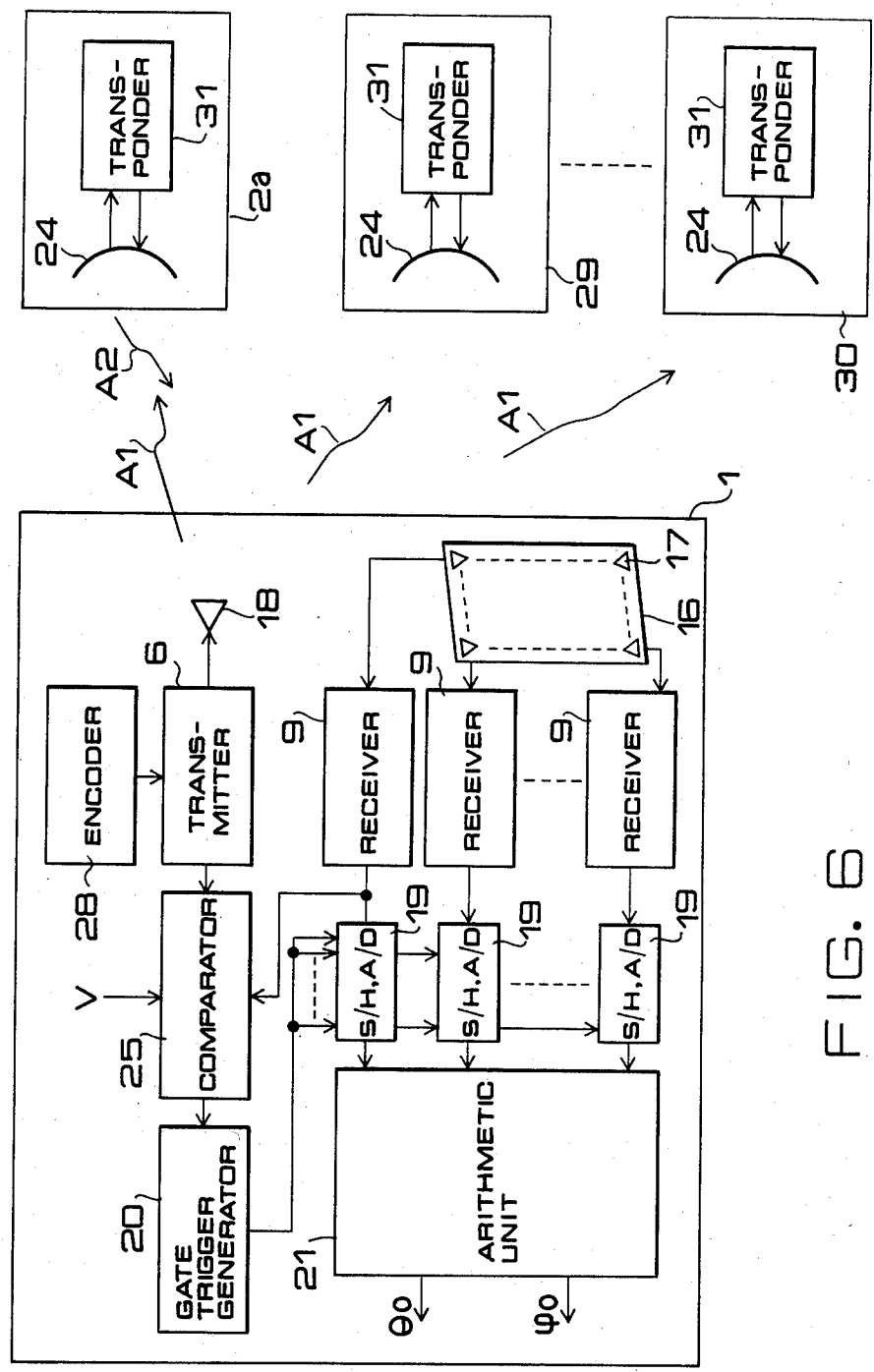

Although the invention has been described with reference to a case in which only one space station exists, however, the present invention is applicable likewise to a case in which a plurality of space stations exist. FIG. 6 shows a third embodiment of the present invention as applied to a case in which a plurality of space stations exist. Referring to FIG. 6, there are shown an encoder 28, space stations 2a, 29 and 30 and transponders 31. The encoder 28 encodes a first radio wave A1 generated by a transmitter 6 so that only a particular one of the transponders 31 of the space stations, for instance, the transponder 31 of the space station 2a, responds to the first radio wave A1 and transmits a second radio wave A2 for tracking one particular space station. The actions of the transponder 31 will be described hereunder in connection with FIG. 7.

Figure 7:
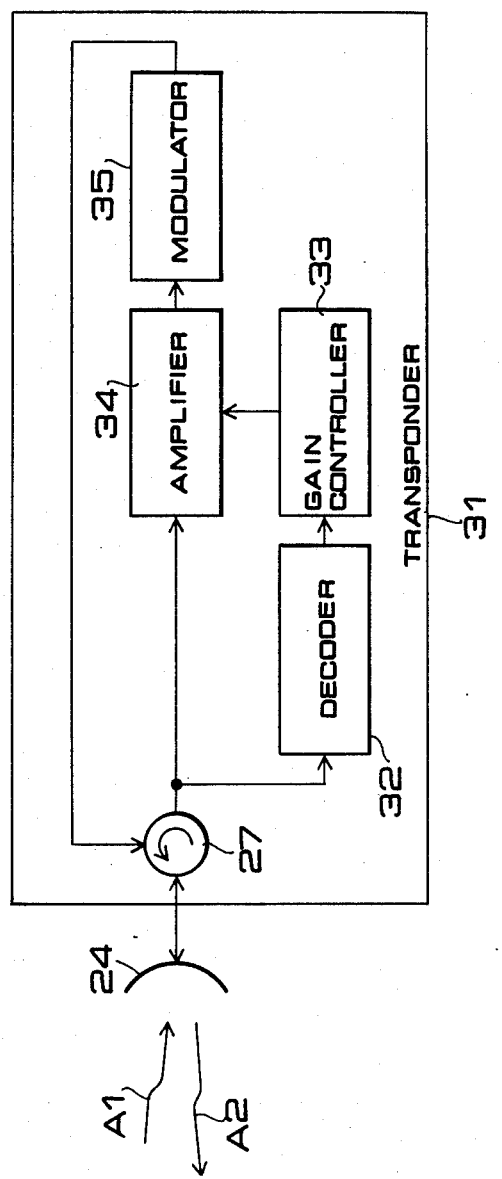
FIG. 7 is a block diagram of a transponder employed by the radar system according to the present invention.

FIG. 7 is a block diagram showing the constitution of the transponder 31. In FIG. 7, there are indicated at 32 a decoder, at 33 a gain controller, at 34 an amplifier and at 35 a modulator. The first radio wave A1 is supplied through the transponder antenna 24 and the duplexer 27 to the amplifier 34 and the decoder 32. The decoder 32 decodes the codes included in the first radio wave A1 supplied thereto and compares the code with a predetermined code. The predetermined code is used for discriminating the space station 2a, the space station 29 and the space station 30 from each other. For each decoder 32, a specific code corresponding to the associated space station is set. The decoder transfers the result of comparison of the codes to the gain controller 33. The output signal given by the decoder 32 is, for instance, a voltage signal above a (volt) for the coincidence of the codes and a voltage signal below a (volt) for the disagreement between the codes. The gain controller 33 controls the gain of the amplifier 34 so that the gain is kept at zero in the normal state and is raised to a large value only when the output voltage of the decoder 32 exceeds a (volt). That is, only when the decoded code coincides with the predetermined code stored in the decoder 32, the first radio wave A1 is amplified by the amplifier 34 and the amplified radio wave A1 is transferred to the modulator 35. The modulator 34 modulates the first radio wave A1 given thereto through waveform shaping and center frequency conversion to generate a second radio wave A2 and radiates the second radio wave A2 through the duplexer 27 and the transponder antenna 24 into the external space. When the decoded code does not agree with the predetermined code stored in the decoder 32, the amplifier functions as a breaker, hence the second radio wave A2 is not generated.

Thus encoding the first radio wave A1 and additionally providing the transponder with means to decode the code included in the first radio wave A1 and means to control the generation of the second radio wave A2 according to the status of the decoded code limits the source of the second radio wave A2 to a single space station. Accordingly, the spacecraft equipped with a radar system of the present invention is capable of identifying and searching for a particular space station among a plurality of space stations and tracking the same.

Figure 8:
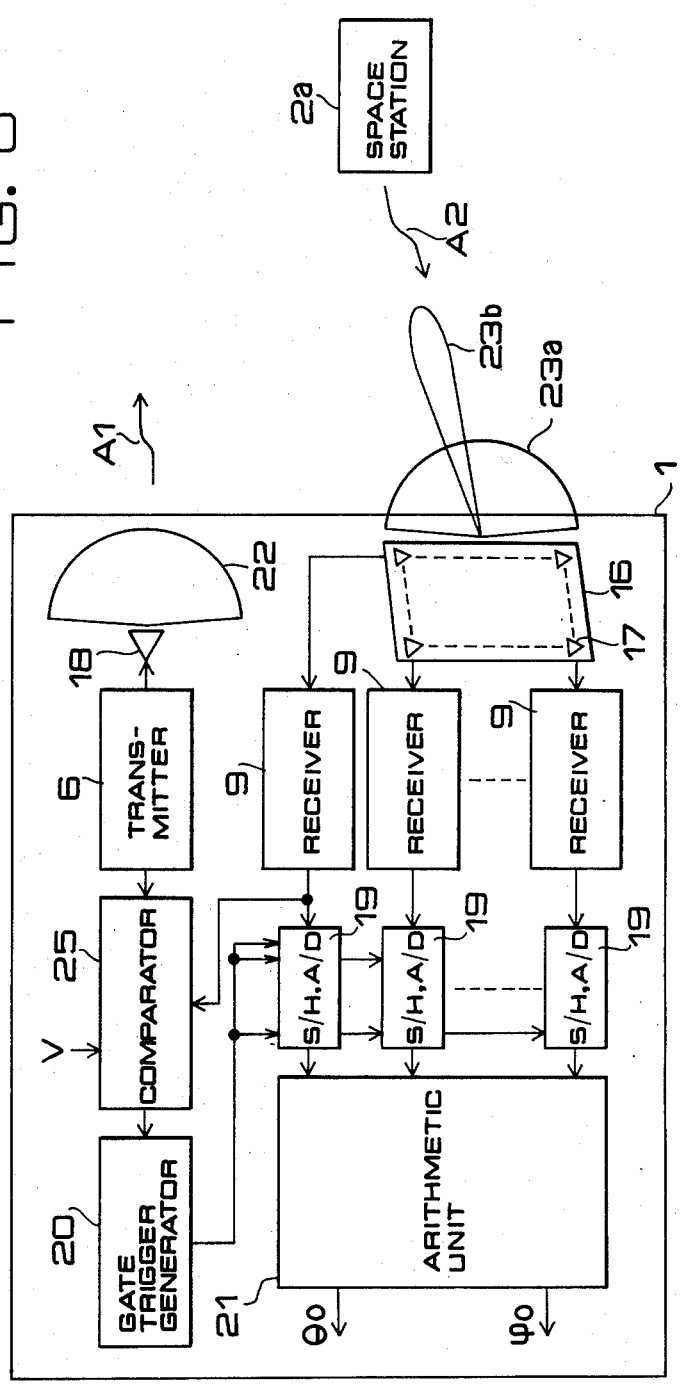

The invention has been described with reference to a case in which the transponder is installed in a space station, i.e., a second flying object, and the second radio wave is transmitted from the second flying object, however, the application of the present invention is not limited thereto, but may be applied to a case in which the transponder is not installed in the second flying object and the second radio wave is the reflection of the first radio wave reflected from the second flying object. FIG. 8 shows a radar system, in a fourth embodiment, according to the present invention for such a mode of application of the invention. The embodiment of FIG. 8 is entirely equivalent to that of FIG. 3 in the constitution and the functions of the radar system put aboard the spacecraft 1, except that the space station 2a is not provided with any transponder and the reflection of the first radio wave A1 is employed as the second radio wave A2. In this embodiment, however, the relative distance between the space station 2a and the spacecraft 1 is calculated with $t_D$ (the delay time for the radio wave generation of the transponder) in Exp. (1) is zero.

Since the radar system according to this embodiment needs no transponder, this radar system has an advantage that searching for a space station and tracking the same are achieved regardless of whether or not any transponder is provided. On the other hand, this radar system has a disadvantage that the SN ratio is small in receiving the second radio wave. This disadvantage can be overcome by providing a high-power transmitter.

In the embodiment of FIG. 8, the radar system put aboard the spacecraft 1 is provided with a transmitting antenna and a receiving array antenna separately, however, the same effect is obtained when one of the antenna elements of the receiving array antenna is used commonly as a transmitting antenna and the antenna element of the receiving array antenna. FIG. 9 shows a further embodiment of the present invention having such a constitution mentioned immediately above. The embodiment of FIG. 9 and that of FIG. 8 are entirely equivalent in constitution and functions, except that the embodiment of FIG. 9 is provided with a duplexer 27 and one particular antenna element among the antenna elements 17 of an array antenna 16 is used as a transmitting antenna.

As has been described hereinbefore, since the radar system according to the present invention need not perform the mechanical scanning operation of the antenna, any antenna scanning mechanism need not be provided, and thereby a compact and lightweight radar system is provided. Furthermore, since searching for the target over the entire space is made at a time, the target can be found within a very short time for tracking. Still further, since most spaceborne communication systems employ nondirectional antennas, the radar system of the present invention is capable of using many microwave components including antennas in common with the communication systems, which brings about remarkable reduction of the total weight and volume of all the equipments to be put aboard a spacecraft or a space station.

It is obvious from what has been described hereinbefore that the radar system according to the present invention is extremely effective as a spaceborne radar system.

What is claimed is:

1. A radar system comprising:
    a radio wave transmitting means having a transmitter which generates a first radio wave, and a first nondirectional antenna which radiates the first radio wave generated by the transmitter into external space, said radio wave transmitting means being aboard a first flying object;
    a radio wave transmitting and receiving means having a second nondirectional antenna for receiving the first radio wave radiated by the first nondirectional antenna, and a transponder which amplifies and modulates the first radio wave received through the second nondirectional antenna to generate a second radio wave and to radiate the second radio wave through the second nondirectional antenna into the external space, said radio wave transmitting and receiving means being aboard a second flying object; and
    a radio wave receiving means having an array antenna having a two-dimensional arrangement of a plurality of nondirectional antenna elements which receive the second radio wave generated by the transponder, a plurality of receivers which amplify and detect the second radio wave received through the nondirectional antenna elements constituting the array antenna to generate a plurality of corresponding receiving signals, means to decide whether or not the amplitude of the receiving signal detected by a designated one of the receivers is greater than a specified threshold, means to generate a trigger pulse only when the amplitude detected by the designated receiver exceeds the specified threshold, a plurality of sampling and quantizing means which, in response to the trigger pulse, sample and quantize simultaneously the plurality of receiving signals generated by the receivers, and a goniometric means which processes the output signal of the sampling and quantizing means to measure the direction of arrival of the second radio wave, and said radio wave receiving means being aboard said first flying object.

2. A radar system as set forth in claim 1, wherein said transmitter for generating the first radio wave includes means to encode the first radio wave and said transponder includes means to decode the coded first radio wave and means to control the transmission of the second radio wave in accordance with the code.

3. A radar system as set forth in claim 1 wherein one of the nondirectional antenna elements constituting the array antenna is used in common both as one antenna element of the array antenna and as the first nondirectional antenna for transmitting the first radio wave.

4. A radar system as set forth in claim 1, wherein said goniometric means includes Fourier transformers for providing discrete Fourier transformation, means for providing monopulse operation, and peak detectors for detecting maximum values.

5. A radar system aboard a flying object, comprising: a nondirectional transmitting antenna, a transmitter for energizing the nondirectional transmitting antenna to radiate a radio wave into external space; an array antenna having a two-dimensional arrangement of a plurality of nondirectional antenna elements which receive the reflection of the radio wave radiated by the nondirectional antenna and reflected by a target; a plurality of receivers which amplify and detect said reflection received by the corresponding antenna elements of the array antenna to produce a plurality of corresponding receiving signals; means for determining and amplitude of the receiving signal detected by one of said receivers being greater than a specified threshold to generate a sampling pulse; a plurality of sampling and quantizing means operated by the sampling pulse for sampling and quantizing the plurality of receiving signals produced by said receivers simultaneously; and means for determining the direction of arrival of said reflection from the output signals of said sampling and quantizing means.

6. A radar system as set forth in claim 5, wherein one of the nondirectional antenna elements of said array antenna is used in common as one antenna element of the array antenna and as the nondirectional transmitting antenna.

7. A radar system as set forth in claim 6, wherein said direction of arrival determining means includes Fourier transformers for providing discrete Fourier transformation, means for providing monopulse operation, and peak detectors for detecting maximum values.

* * * * *